(No Model.)
G. N. BRIGGS.
WHIFFLETREE HOOK.
No. 368,322. Patented Aug. 16, 1887.
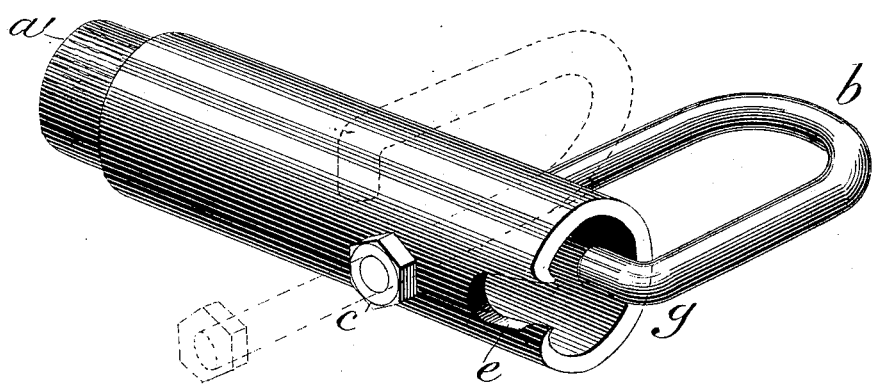
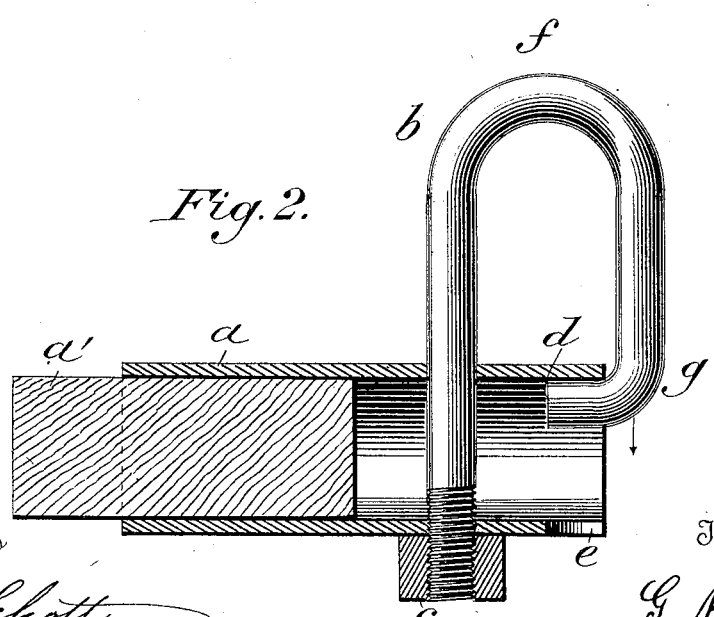

UNITED STATES PATENT OFFICE.

GEORGE N. BRIGGS, OF YOUNT, ASSIGNOR OF ONE-HALF TO JOHN BACHELDER, OF NAPA, CALIFORNIA.

WHIFFLETREE-HOOK.

SPECIFICATION forming part of Letters Patent No. 368,322, dated August 16, 1887.

Application filed May 14, 1886. Serial No. 202,217. (No model.)

*To all whom it may concern:*

Be it known that I, GEORGE N. BRIGGS, a citizen of the United States, residing in Yount township, in the county of Napa and State of California, have invented a new and Improved Mode of Constructing Whiffletrees, of which the following is a description.

My invention relates to an improvement in the construction of whiffletrees by which safety, convenience, and economy are secured.

In the drawings, Figure 1 is a full-size top view of one end of a whiffletree, and Fig. 2 a full-size central sectional view of the same parted horizontally.

Referring to the accompanying drawings by letter, $a$ represents the bar, usually made from one-inch-iron steam-pipe, but may be solid in the center and only hollow at the ends. When iron pipe is used for the bar and greater strength is required, I drive a close-fitting plug, $a'$, made of good timber, into the center of the bar.

$b$ represents the hook, the straight stem of which is loosely fitted in a horizontal position in holes near the end of the bar, and has a threaded nut, $c$, on its rear end, which is adjusted to bear on the back outside at the same time that the bent end of this hook has a bearing on the front inside of the bar, as seen at $d$, thus dividing the strain.

On the back side of the bar at the end is a slot, as seen at $e$, through which the bent end of the hook is drawn into its seat after the trace is hooked on and pushed back through it to release the trace.

The curved outline of that portion of the hook between the point at $f$ opposite where the trace-eye rests when in use and the heel of the bend at $g$ is intended to act as a guard to ward off vines or whatever it may come in contact with, to prevent injury.

What I claim as my invention, and desire to secure by Letters Patent, is—

The bar $a$, with its hollow ends slotted and fitted to and in combination with the hook $b$, substantially as described, and for the purpose specified.

GEORGE N. BRIGGS.

Witnesses:
R. H. STERLING,
G. W. TOWLE.